US009165060B2

(12) United States Patent
Dies (10) Patent No.: US 9,165,060 B2
(45) Date of Patent: Oct. 20, 2015

(54) CONTENT CREATION AND MANAGEMENT SYSTEM (71) Applicant: Percolate Industries, Inc., New York, NY (US)

(72) Inventor: Erik Dies, Brooklyn, NY (US)

(73) Assignee: Percolate Industries, Inc., New York, NY (US)

(*) Notice: Subject to any disclaimer, the term of this patent is extended or adjusted under 35 U.S.C. 154(b) by 0 days.

(21) Appl. No.: 13/843,589

(22) Filed: Mar. 15, 2013

(65) Prior Publication Data

US 2014/0222819 A1    Aug. 7, 2014

Related U.S. Application Data

(60) Provisional application No. 61/617,935, filed on Mar. 30, 2012, provisional application No. 61/707,532, filed on Sep. 28, 2012, provisional application No. 61/725,867, filed on Nov. 13, 2012, provisional application No. 61/707,503, filed on Sep. 28, 2012, provisional application No. 61/725,860, filed on Nov. 13, 2012, provisional application No. 61/725,895, filed on Nov. 13, 2012.

(51) Int. Cl.
*G06F 17/30* (2006.01)
*G06F 7/00* (2006.01)

(52) U.S. Cl.
CPC ...... *G06F 17/30707* (2013.01); *G06F 17/3053* (2013.01); *G06F 17/30864* (2013.01)

(58) Field of Classification Search
USPC ........................................... 707/740
See application file for complete search history.

(56) References Cited

U.S. PATENT DOCUMENTS

2002/0199187 A1* 12/2002 Gissin et al. ............... 725/32
2009/0083251 A1*  3/2009 Sahasrabudhe et al. ...... 707/5
2011/0289088 A1* 11/2011 Yarin et al. ................ 707/738

* cited by examiner

*Primary Examiner* — Kuen Lu
(74) *Attorney, Agent, or Firm* — Antonio Papageorgiou; Meister Seelig & Fein LLP (57) ABSTRACT

The present application provides a system for creating content for a first entity. In one aspect of the application, content creation and management system defines a virtual content channel, wherein the virtual content channel comprises content sources in the combined set of content sources that are above a similarity threshold based on the similarity score. The virtual content channel is defined by (1) determine categories for a plurality of content sources, wherein each content source is related to the category; (2) determine a first set of content reference categories, the first set of content reference categories relate to a first entity content source; (3) determine a second set of content reference categories, the second set of content reference categories relate to a brand theme; (4) determine a combined set of content sources, the combined set of content sources relate to the first content reference set of categories and the second content reference set of categories; (5) determine a similarity score between each of the content sources in the combined set of content sources; and (6) compile content sources that exceed a similarity threshold based on the similarity score.

15 Claims, 5 Drawing Sheets

CONTENT CREATION AND MANAGEMENT SYSTEM

RELATED APPLICATION

This application claims the benefit of U.S. Provisional Application Ser. No. 61/617,935 filed Mar. 30, 2012, entitled "Interactive Computing Recommendation Facility with Learning Based on User Feedback and Interaction"; U.S. Provisional Application No. 61/707,532 filed Sep. 28, 2012 entitled "Hashtable Comparator"; U.S. Provisional Application No. 61/725,867 filed Nov. 13, 2012 entitled "Hashtable Comparator"; U.S. Provisional Application No. 61/725,860 filed Sep. 28, 2012 entitled "Headline Similarity Comparator"; U.S. Provisional Application No. 61/725,860 filed Nov. 13, 2012 entitled "Headline Similarity Comparator" and U.S. Provisional Application No. 61/725,895, filed Nov. 13, 2012, entitled "Content Creation and Management System", which are hereby incorporated by reference.

FIELD OF APPLICATION

The present application is related to content creation and management systems. The application has particular applicability in assisting entities such as brands, vendors, advertisers, etc. interested in expanding the scope and reach of their online engagement with customers and potential customers.

BACKGROUND

In the Internet domain, merchants of goods and services have relied primarily to date on so-called banner advertising to promote their name and increase awareness. This form of advertising is rapidly falling out of favor both because it is relatively ineffective and is not available in many social forums where advertisers may wish to establish a presence. Social networking sites help foster brand awareness through increased communications and serve as a relatively inexpensive platform for organizations to implement marketing campaigns. However, many of these social networking sites, such as Facebook, allow only a small percentage of an interface to present advertising to a user. The situation is even more restricted in mobile applications, as device displays are smaller, and users are not keen to share limited viewing space with undesirable advertising.

Thus, in the next phase of digital marketing, brands may no longer have special boxes (ad units). For example, Facebook recently announced that it is allowing advertisers to post in a mobile news feed, where they have been identified to have the greatest engagement rate.

Merchants, therefore, must create or utilize other means for engaging with users which permit them to present relevant and interesting content. However, to do so on a massive scale is challenging given that advertisers, historically, have not focused on creating large amounts of content, and did not have effective tools for doing so. Moreover many merchants/brands have been reluctant to engage with their customers except with carefully controlled and vetted messages that are inherently created in a slow, deliberate fashion.

In addition, another limitation of traditional banner advertising is frequently the lack of flexibility or adaptability to new information, such as news, events, changing interests of their audience, etc. Advertisements rapidly become stale and do not adapt well to context changes associated with a brand audience.

These and other limitations of current brand advertising are addressed in the present disclosure.

SUMMARY

The present application provides a system for creating content for a first entity. In one aspect of the application, content creation and management system defines a virtual content channel, wherein the virtual content channel comprises content sources in the combined set of content sources that are above a similarity threshold based on the similarity score. The virtual content channel is defined by (1) determine categories for a plurality of content sources, wherein each content source is related to the category; (2) determine a first set of content reference categories, the first set of content reference categories relate to a first entity content source; (3) determine a second set of content reference categories, the second set of content reference categories relate to a brand theme; (4) determine a combined set of content sources, the combined set of content sources relate to the first content reference set of categories and the second content reference set of categories; (5) determine a similarity score between each of the content sources in the combined set of content sources; and (6) compile content sources that exceed a similarity threshold based on the similarity score.

Further embodiments of the present application monitor the virtual content channel on behalf of the first entity to identify a first online story of potential interest to the first entity. To accomplish this, the content creation and management system generates a score for the first online story based on the first entity content specification requirement and first entity creation requirements and presents the first online story to a first operator for said first entity when said first score exceeds a predetermined threshold. A publishing tool is presented to the first operator. The publishing tool is adapted to automatically configure a content piece for publication into one or more channels, each of which channels imposes different publishing formatting constraints.

A set of recommended content is created for the first operator to be incorporated within a new first content piece. The recommended content includes one or more links, text or multimedia data. Then, a new first content piece is created with said publishing tool under control of said first operator, which new first content piece is generated based on a compilation of said first online story, said first entity related content, first operator provided content, and said recommended content. The new first content piece is published into said one or more channels in a format appropriate to each of said channels.

An index of first entity related content is compiled along with a reference set comprising at least one of: keywords, topics and categories associated with a reference set of content sources. A first entity content specification requirements of a target content of the first entity and a first entity target content creation requirements comprising at least a timing parameter is received. The content specification requirement comprises at least one of keywords, topics and categories. A virtual content channel is then defined for said first entity based on said reference set, said first entity target set and said first entity target content creation requirements. The virtual content channel is monitored on behalf of said first entity to identify a first online story of potential interest to said first entity. A score is generated for said first online story based on said first entity content specification requirement and first entity creation requirements. The first online story is then presented to a first operator for said first entity when said first score exceeds a predetermined threshold. A publishing tool is also presented to the first operator. The publishing tool adapted to automatically configure a content piece for publication into one or more channels, each of which channel(s) imposes different publishing formatting constraints. A set of recommended content is created for the first operator to be incorporated within a new first content piece. The recommended content includes one or more links, text and/or multimedia data. A new first content piece is also created with said publishing tool under control of said first operator. The new first content piece is generated based on a compilation of said first online story, said first entity related content, first operator provided content, and said recommended content. And finally, the new first content piece is published into said one or more channels in a format appropriate to each of said channels. In some instances, a routine is adapted to queue new content pieces until released by the first operator or an automated scheduler.

Furthermore, the content creation and management system may monitor and measure online engagement with said new first content piece over a first time period. Based on said measured online engagement, the virtual content channel can be adjusted by altering said entity candidate customized subset or a scoring algorithm used for rating online stories.

DETAILED DESCRIPTION

Figure 1A:
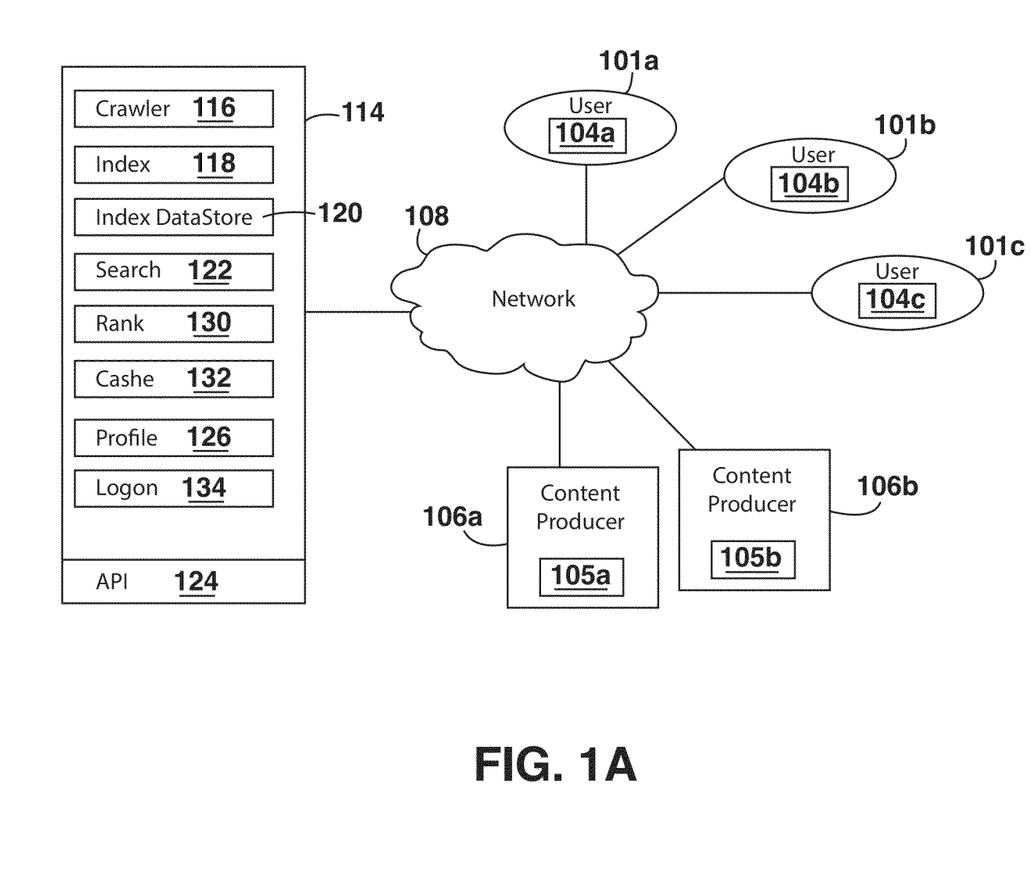
FIG. 1a is a block diagram illustrating a system for automated content management system for discovery of time-sensitive content that is relevant to a user.

FIG. 1a illustrates a system for automated content management. The system generally includes at least one computing device operable to perform the steps or otherwise provide the functionality discussed herein. In one embodiment, the system includes at least one server computer 114 coupled over a network 108 to one or more client device 101a-101c. According to one embodiment, a user interacts with a client device 101a, 101b and 101c. Client device may be a personal computer of the type that is well known to those of skill in the art and may include (not pictured) a processor, transient memory (e.g., RAM), persistent memory (e.g., hard drive), input device (e.g., mouse and keyboard) and circuitry to provide communication paths between the components. Other clients include, but are not limited to, PDAs, cellular devices, thin clients, etc.

A given client device 101a, 101b and 101c may comprise network interface hardware and software that provides the client with the ability to transmit and receive data over a network 108. The network 108 may be a local area network, a wide area network, or combinations thereof, e.g., the Internet, and provide communication channels between the clients 101a, 101b and 101c, content source computers 106a and 106b, content creation and management system computers 114, and other information sources.

The one or more content sources 106a and 106b host content items 105a and 105b accessible to clients 101a, 101b and 101c, over the network 108. A content item may contain one or more content item units, e.g., text, graphics, audio, video, etc. As used herein, the term content item refers to any set of content item units that is/are identifiable by a unique location or address (e.g., a URL). A client 101a, 101b and 101c, uses a client application 104a, 104b and 104c, such as a web browser, to issue a request for a content item to a content source 106a and 106b by providing an address for the content item. The client application 104a, 104b and 104c receives the content item 105a and 105b that is responsive to the request and renders the content that is contained in or pointed to by the content item. For example, where a browser running on a client requests a web page from a web server, the browser receives the requested page and renders the content in the page, as well as the other interface screens discussed herein, which may include links to download and render content items from other web sites.

Due to the vast number of content items located on the Internet, it is increasingly difficult to locate content items of interest in a time sensitive manner. A content creation and management system 114 provides a mechanism that provides clients content items of interest that are time sensitive and preferably most relevant to the clients or the client's interests. A content creation and management system 114 may comprise a crawler component 116, an indexer component 118, an index data store 120, a search component 122, a ranking component 130, a cache 132, a profile data store 126 to provide persistent storage for one or more user profiles 128, a logon component 134, and an API 124 that the components 116, 118, 122, 130, 132 and 134 may use to execute functions for storage, retrieval and manipulation of data in the index data store 120 and profile data store 126. It should be noted that the content creation and management system 114 and its constituent components and data stores may be deployed across the network 108 in a distributed manner whereby key components may be duplicated and strategically placed throughout the network 108 for increased performance, e.g., close to the edges of the network.

The content creation and management system 114 comprises a crawler component 116 that is operative to open a communications channel with a content source 106a and 106b content source over the network 108. The crawler 116 retrieves content items 105a and 105b from the content source 106a and 106b and may store a copy of the content item in a cache 132 at the content creation and management system 114. The cache 132 is a data structure that a persistent storage device maintains for the storage of content items, as is known to those of skill in the art. The crawler component 116 may also follow links to other content items that a given content item 105a and 105b references, navigating to the referenced content item and saving a copy of the content item in the cache 132, and so forth. Preferably, the crawler component 116 retrieves content items from a plurality of content sources 106a and 106b in a substantially simultaneous manner so as to collect content items 105a and 105b from the greatest number of content sources 106a and 106b in the least amount of time.

In addition to using the crawler component 116 to collect content items 105a and 105b from over the network 108, the content creation and management system 114 may also collect information on individual users by monitoring user interaction with client applications 104a, 104b, and 104c, content sources 106a and 106b, the content creation and management system 114 and other information sources made available over the network 108. The content creation and management system 114 may collect information according to a number of techniques.

Alternatively, a client application 104d and 104e may be in communication with a proxy server 112. Data traffic from the client 101d and 101e passes through the proxy server 112 prior to receipt by the component to which the data is addressed, e.g., content source 106a and 106b. The proxy server 112 may record information from the stream of data traffic transmitted and received by the client application 104d and 104e. The proxy server 112 may further aggregate this information from a plurality of connected clients 101d and 101e and periodically transmit the information to the content creation and management system 114. Where the client application 104a and 104b employs neither a plug-in 128 nor transmits and receives information through a proxy server 112, the content creation and management system 114 may directly collect information from the stream of data that the client application transmits and receives. For example, where the search provider maintains a suitably large collection of content items in the cache 132, the user may browse though content items from the cache 132 as opposed to browsing the content item from its source location 106a and 106b, allowing the content creation and management system 114 to observe information in the data stream. Similarly, the content creation and management system 114 may provide the user with one or more controls that allow for saving content items to the cache 132.

In addition, the content creation and management system 114 may provide advanced functionality that allows a user to perform one or more actions upon content items 105a and 105b that the user browses. The content creation and management system 114 comprises an API 124 that exposes functions for allowing the user to personalize content items and the content contained within content items, such as saving, tagging, annotating, etc., as well as maintain a user's navigation history, which is referred to herein as personalization. Personalization actions that the API 124 provides include, but are not limited to, saving copies of content items, tagging content items, annotating content items, and performing other actions, e.g., highlighting content in a content item. The content creation and management system 114 comprises a login component 134 that provides authentication of a user's credentials, thereby providing access to contextualized information for the user, e.g., a profile, which may include a portion of dedicated persistent storage space. Credentials that the user provides to the login component 134 may comprise a username/password pair, a physical token, a biometric identifier, or other identification credentials known to those of skill in the art.

Regardless of the specific manner in which the content creation and management system 114 receives information regarding the use of the client application 104a, 104b and 104c, the content creation and management system 114 creates a profile 128 for each user of a client application 104a, 104b and 104c with which the content creation and management system 114 is in communication for the storage of contextualized information. The content creation and management system 114 generates one or more user profiles 128 that organize and provide a given user with access to his or her contextualized information, as well as allow the content creation and management system 114 to leverage the contextualized information in indexing, searching and ranking of content items, thereby enhancing the relevance of items.

The present application works from a premise that merchants/brands must create content at larger and social scales to be effective in competition for attention on the Internet. To optimize their engagement, brands should act and create content like people on platforms such as Facebook, Twitter, Tumblr or website operating from a plug in.

The challenge then becomes how to generate larger and more relevant content. A variety of techniques are disclosed below which are incorporated in automated tools to assist merchants/brands to achieve this goal.

The present disclosure therefore teaches embodiments for creating and managing social media content using the process 100 identified in FIG. 1. On a high level embodiments of the present application operate by: 1) surveying/identifying brand relevant topics, interests, themes to identify and build a virtual channel of source content or brew from selected sources ("calibration") 2) filtering the brew to identify a set of key stories ("monitoring"); 3) automatically discovering new content relevant to the brand; ("discovering"); 4) creating new content or selecting new content from the discovered new content for the brand ("creating" or "selecting") 4) publishing the new content into desired channels/sources of social media based on the key stories and other brand content/context ("stock/flow publishing"); 5) measuring engagement and/or awareness of the published content in the appropriate channels/sources to adjust inputs, filters, etc. ("training" or "tuning"). An enhanced publishing platform assists brands in rapidly creating and disseminating new content that is appropriately formatted and can be based on channel-specific content recommendations. In a preferred embodiment the brand-specific brew of content can be set up in a matter of minutes to allow the entity to quickly ascertain a quality of the source content. Through this type of dynamic iteration, the entity can design and verify an optimal virtual channel of source content.

Figure 1B:
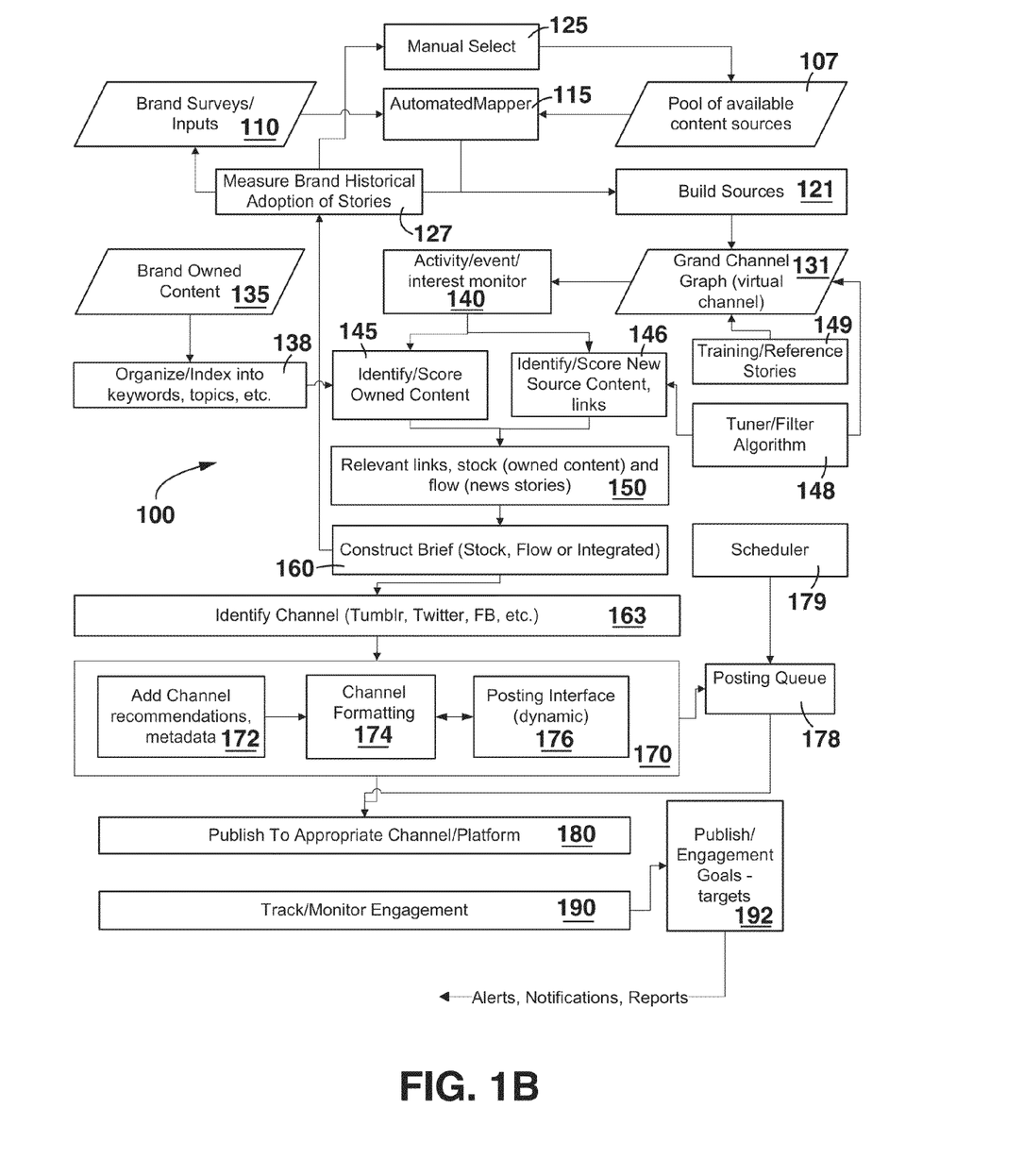
FIG. 1b depicts operations and processes employed in preferred embodiments of a content creation and management system of the present application.

As seen in a preferred embodiment in FIG. 1b, content sources or channels are preferably compiled into a pool of available content sources 107, which may be further categorized by topic, domain, etc. The categorized content sources are stored in a database as a first set of content sources. The categorized content sources may include keywords, topic designations, brand names, etc., and can be used to construct a source interest graph. The term 'channel' and the term 'source' are used interchangeably and generally represent any source of content that can be filtered. Discovery of additional sources can also be done through automated tools in some applications.

The identification of the categories used for classification of content sources as well as the brand content can be determined by a number of different techniques which are preferably automated but which can include a manual component as a starting point or as part of creating. In one embodiment, categories can be seeded with particular channels or sources and then related channels can be similarly assigned. It will be appreciated that there need not be a 1:1 correlation of channels to categories, in that a channel could be classified, for example, as both fashion and sports. In addition, a channel classification could be assigned based on determining a confidence or applicability measure or a similarity score (i.e., fashion: 0.95, sports: 0.37).

The categorized content sources, in one embodiment, can be used to construct a source interest graph. The source interest graph is a web of content sources that are mapped to other relevant content sources. This is done automatically by a software routine that matches or maps particular content sources based on topics, keywords, etc.

Preferably, the source interest graph is created by searching for matches between content sources of interest to an entity and content sources in the first set of content sources. A determination is made as to whether or not a match exists between the content source of interest and the content sources in the first set of content sources. When it is determined that at least one match exists, an association or link is created between the matching content sources. The result is a source interest graph of content sources relevant to an entity.

Brand surveys and input from representatives are preferably solicited at step 110 to help define the theme, goals and target audience of the brand. The surveys and input help determine how the entity prefers the brand to be viewed, relevant channels for publishing, and how many times to publish. This survey is conducted with an eye to understanding the entity's target market. Other approaches can be used of course to glean the following basic information on content matching, or what can be considered entity content specification requirements:

Words that describe or represent the brand;
Categories the brand fits into or is relevant to;
Categories relevant for them to comment on;
Negative words or categories that the brand worries about being associated with them;
Proper voice/tone for the brand;
Other brands/companies they admire;
Who are their competitors;
Where they want to publish to;
Channels they think they want or need to monitor; and
Frequency with which they need to acquire new content.

Similarly the entity can be requested to provide entity target content creation requirements, with timing/currency insights such as:

Frequency with which the brand needs to publish;
How important recent stories are;
Importance of commenting on popular stories; and
Importance of discovering content/being one of the first few in the conversation.

Other psychographic and demographic questionnaires can be used to identify brand goals and target audiences. In one embodiment, brands may already have a significant understanding of what sources are appropriate, and therefore a manual selection option can be employed for designating relevant sources. The surveys/questionnaires can be administered in person, or by an automated routine which allows the entity's representatives to provide the information in an automated interview over the Internet.

It is also possible to automatically mine the entity's own literature, website materials, etc. to glean and categorize keywords, topics, interests and the like to identify brand goals and target audiences using techniques well known in the art. Information from the entity may include file transfers, pdf files, folders, which is ingested and indexed in a database. In one embodiment, the entity's own social media sources maybe accessed determine brand goals and target audiences. This type of solicitation could be used in addition to or in lieu of the above in some cases to more rapidly bootstrap or market to prospects.

In short, through automated, manual and/or self-administered questions and surveys, the theme of the brand's image can be determined, which can then be used to determine which content source categories are relevant to the entity. The information gathered from the brand surveys, input, questionnaires and the entity's literature is stored and analyzed to determine a brand theme. The brand theme may include key words, topics, etc. that describes the theme. Content sources related to the brand theme are ascertained by matching the key words, topics, etc. used to describe the theme with keywords, topics, etc. associated with the content sources. The content sources that match create a second set of content sources. The second set of content sources can create a second source interest graph of relevant content sources. The system searches for matches between a content source of interest and content sources in the second set of content sources. If at least one match exists an association or link is created between the matching content sources. The result is a second source interest graph of relevant content sources.

The keywords, topics, categories can be predefined and can preferably include both categorization of content (sports, cooking, cameras) and quality of content (informal, formal, long form).

By using the content sources in the first and second source interest graphs, the system may create a virtual content channel. The virtual content channel includes all content sources that best represent the brand of the entity. To create a virtual content channel, content sources explicitly identified by the sources in the first and second source interest graph are pooled and recorded. The pooled content sources are then matched or mapped with each other, creating the virtual content channel. This virtual content channel is customized for the entity based on the aforementioned content specification and content creation requirements.

In a preferred approach the mapping step 115 between the first source interest graph and the second source interest graph is done automatically by a software routine to determine a match or mapping of particular topics, keywords, etc. Sources making up the first and the second source interest graphs are pooled and the sources that are matched according to a set of criteria. In one embodiment, the software routine is using algorithmic scoring to match the pooled content items. The content sources are ranked based on the content sources' score and included in the virtual content channel. In another embodiment, only content sources exceeding a threshold will be included in the virtual content channel.

Some of the criteria that can be used to map and identify relevant sources includes but is not limited to examining the sources for such data as:

source category;
topics mentioned by the source;
topics mentioned by the source in a given time window;
tone;
publishing behavior (e.g. frequency of publishing);
characteristics of published content (e.g. length, pictures, video); and
popularity.

These criteria are used to find the best matches amongst the pool of content sources. It will be apparent that others can be used as well. In one embodiment, it is useful to have a human reviewer designate at least some of the sources (based on personal knowledge) and/or confirm the utility and accuracy of any automated matches.

Each of the sources (which may be on the order of a hundreds or thousands of separate channels) can be assigned a similarity measure or score related to other sources to make identification of other candidates easier and faster. These similarity measures amongst this pool of sources (link weights $W_L$) are used build out an expanded graph 131 of sources, filtered or scored by the criteria, as seen in FIGS. 2A to 2C.

Figure 2A:
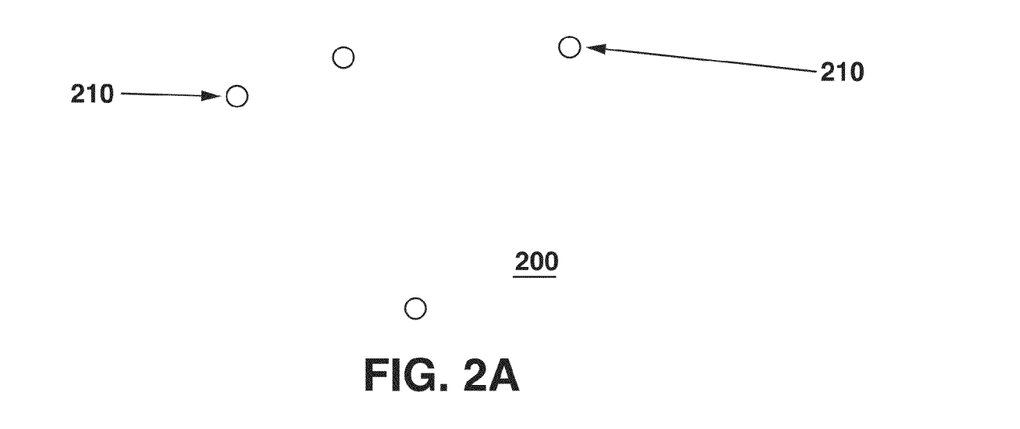
FIG. 2A illustrates a channel graph and construction of nodes for the same used in preferred embodiments of the present application.
Figure 2B:
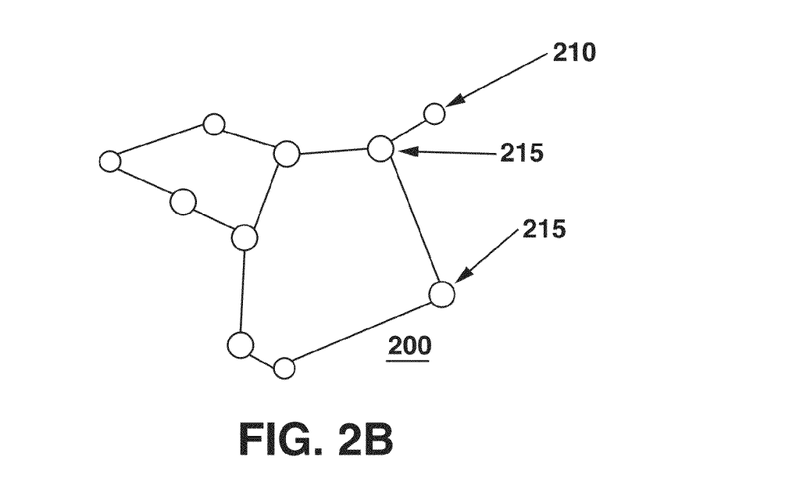
FIG. 2B illustrates a channel graph and construction of nodes for the same used in preferred embodiments of the present application.

FIG. 2A shows how a seed set of sources, the categorized content sources, is injected into a master or grand channel (source) graph 200. The master channel graph is a web of all the channels in the system. The master channel graph is constructed from historical data on the channels in a database and helps identify content sources relevant to the entity. The Graph nodes represent the content sources and the Graphs edges represent similarity between channels.

In one implementation, the similarity between the two channels is the probability that the two channels will publish stories that share the same link. The seed sources occupy positions on this master graph, and may or may not be connected initially. Additional weighted shortest paths are constructed between these nodes 210, as seen in FIG. 2B to form an initial skeleton of additional useful linked set of sources 215. These shortest paths may be constructed on the total graph or on a significant connected subgraph and may be weighted based on how often the channels in the paths are posted on, how the channel's recent entries match the reference keywords, how distinct the channels are as descriptions, etc.

Figure 2C:
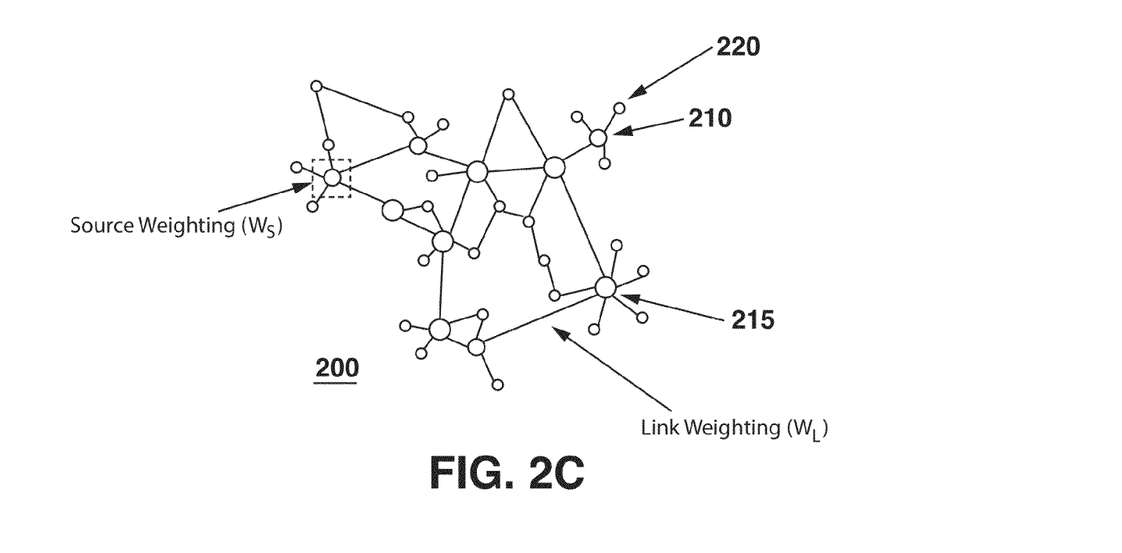
FIG. 2C illustrates a channel graph and construction of nodes for the same used in preferred embodiments of the present application.

Based on comparing the initial seed set and linked set to similar sources and relevance to a brand's collection of content specification and creation requirements—i.e., categories, interests, currency parameters (i.e., needs recent stories, etc.) the initial skeleton is expanded and fleshed out to include a final candidate set of sources for the virtual channel as seen in FIG. 2C. A connected graph of sources for the virtual channel allows the engine to better surface relevant content. When a link from a source is shared, it is more likely in a connected graph that another source in the graph will share or has shared that link. A link's relevance may be tied to how many sources publish a story that shares that link.

This forms a final set of candidate sources or grand channel graph 130 for the brand's brew. Thereafter, as stories are published by these sources, they are reviewed at step 140 by an interest monitor, which detects potentially relevant content. Each of the stories are then scored at step 146 preferably by using separate weights ($W_S$) assigned to the final set of sources based on a configurable tuner/filter 148 value assigned to the channel, at which stage of the graph construction they appear, and a likelihood of matching the collection of categories the brand has. The output of the virtual channel therefore includes both a story and a relevance score rating for the entity in question. It will be understood that the relevance score rating may include subcomponents for ease of review by a human operator, so that content comparison scores and timing/currency requirement scores are identified separately.

In a preferred embodiment, the sources, content similarity comparisons and weights can be calibrated by a routine at step 148 as needed by an operator for the entity to tune the output of the virtual channel or brew. To calibrate the content similarity comparison and the weights, data regarding the entity's publishing behaviors and category interests, e.g. how often they want to post, what they want to post about, is collected. This information may be collected through brand surveys/questionnaires or through administrative personnel. The information is mapped to inputs, wherein the inputs are used to select a pool of channels (on the order of 100) from the all the channels in the content creation and management system. The selected content sources are then presented to the entity as recommended channels. For example, if an entity wishes to publish a dozen posts a day, the content creation and management system would select channels that publish content in high volumes. If the entity subscribe to a recommended channel, the system regard that as having been an appropriate recommendation for the given parameters. This information is stored in the entity's profile.

Using the entity's responses during calibration with the system (the input), what the system recommended (the output), and which content sources were ultimately chosen by the entity to subscribe to (the quality of the output), a data set is created. This data set is used to train a machine learning algorithm to make a more appropriate recommendation for the next client with similar inputs.

In addition the brew can be trained and calibrated by posting a set of reference content stories and specifying/measuring a relevance score attributed to each by a routine at step 149. That is, one instance the relevance score for a reference story is pre-specified and provided to a machine learning tool for a particular source, so that the weights and content scoring are adjusted internally to reflect the desired score. This can be done with a range of reference stories to iteratively adjust an output and scoring of the virtual channel. The end result is a set of references customized to a particular brand/entity.

The output of the brew is then examined dynamically over the course of some desired period to determine if it is performing in accordance with the brand's expectations. In many instances outputs can be seen in a matter of minutes after construction based on accessing a repository of preexisting content (not shown) to assess the quality of the virtual channel output. If alteration is needed, it can be tuned as noted above, through the selection of new sources, different topics/categories, different content scoring, different timing requirement scoring, etc.

An additional adjustment of the brew/virtual channel can also be implemented based on measuring a selection history by the entity in question of the output stories by a routine at step 127. For example, an entity may not select stories that are rated highly by the channel output, but instead selects other set of content that is rated lower. This mismatch should preferably be detected as early as possible before final configuration of the system.

This information can be used to re-solicit a new set of survey items from the entity to create a better set of matching content categories, or to weight certain types of content differently than originally set. The new selected categories for example can be used to identify a new seed set of channels, with additional links from such new seed set made available for inspection by the entity to confirm a closer match to their needs. Sources in the channel graph which do not appear to be producing relevant content can be pruned as desired as well to refine the output. Determining if the content is relevant may be done manually or automatically. A manual determination may be made as to relevancy based on the needs of the entity. Alternatively, based on a training set, a machine learning algorithm can be adopted to determine irrelevant content. Accordingly, the content selection and scoring algorithm can be manually or automatically adjusted to reflect the feedback gleaned from the brand's actual behavior in selecting and posting content.

A continuous list of customized stories is thus presented to the entity in question, to permit the latter to consume relevant and timely content which can then be acted upon in a variety of different ways. For example the entity may elect to do one or more of the following: 1) simply republish the news story with its own branding (for example, a re-tweet on Twitter); 2) comment on the story at a website where it was published by making a post related to the story; 3) re-publish an existing prior brand piece concerning the topics or events in the news story; 4) add further brand related content to the story and publish as a new piece. Other actions will be apparent to those skilled in the art.

As seen in FIG. 1*b* the present system assists operators for an entity to assemble and produce new and relevant content quickly and efficiently. After or while scoring a new story (or list of stories) from the virtual channel at step 146, a routine can also optionally score preexisting brand "owned" content to determine the latter's relevance and possible utility in a new published content piece that is related to the story/stories. It will be understood that in this context, a brand need not actually own the content, but, rather, simply have usage rights sufficient to use the content in question for publication purposes consistent with the present teachings.

Many brands/entities have a store of content 135 they have produced in the past, or there will be other inter-company blogs, feeds, etc. that the entity has rights to use. This content may be text or multi-media. Embodiments of the present application select which of these pieces of entity owned content are most relevant to what is happening in the world right now, and surface them for consideration by an operator so that it can be included in a new content piece to give it more brand "flavor."

To do this, at step 138, a routine indexes and stores topics, keywords and other relevant data for each piece of owned content, including an original publication date and any subsequent re-publication dates. Any suitable organization scheme can be employed for this purpose.

Consequently at step 145 a routine considers the stories output from the brew (the stories most relevant to the brand at the moment), and analyzes topics, keywords, and other relevant data for these stories. A selection can then be made of one or more selected pieces of relevant owned content by automatically matching the data of the owned content to the story data of the current brew. This, in effect, allows a brand or entity to add its own flavor, tenor or voice to a new piece built on or centered around a preexisting story.

To avoid recommending/publishing the same brand owned content too frequently, records may be kept in a database (not shown) of the identification codes of brand pieces have been recommended/published and the associated dates.

To score the brand owned content a number of parameters can be considered, including recency and semantic information including but not limited to:
- keywords;
- word frequency;
- text snippets;
- tags;
- words used;
- sentences; and
- categories.

The routine at 145 thus preferably uses semantic and other techniques in similarity measurements to determine similarity of the stories to pieces of previously indexed content and determine what is most similar. A matching score for each brand owned content piece is thus derived based on its similarity to the story pieces. A list of the top N scoring pieces of the indexed content can then be presented along with other data by a routine at step 150.

The routine at 145 thus preferably uses semantic and other techniques in similarity measurements to determine similarity of the stories to pieces of previously indexed content and determine what is most similar. A matching score for each brand owned content piece is thus derived based on its similarity to the story pieces. A list of the top N scoring pieces of the indexed content can then be presented along with other data by a routine at step 150.

As an example, a story may be output from the virtual channel that a prominent celebrity (e.g. Steve Jobs) has just died, because "Steve Jobs" is a prominent keyword targeted by the entity. In the archives of things the brand may have usage rights to an interview piece from 3 years prior with Steve Jobs. Since the interview is similarly coded with the keyword "Steve Jobs" it can be recommended to the entity for re-publication consideration. In preferred embodiments the system indexes content from all of the brand's publications and databases, including at Vimeo, Instagram, Youtube RSS, etc., and makes all of this searchable and easily re-publishable across multiple channels as noted below.

Therefore at step 150 the system compiles a base "stock" of content to be considered by the entity for inclusion in a new posting or piece, including for example the prior brand, stories from the virtual channel that suggest this is relevant right now, and additional recommended web links, tags, images or other multi-media data related to the story to be shared by the entity to provide brand contextualization. As part of this step, a media picker may be employed as well. This tool finds and retrieves third party content to be considered as part of the base stock, including images or other multimedia items from databases which are public domain and/or have been pre-approved for licensing. Specific tags may be recommended for the new piece as well based on analyzing the items in the base stock.

At step 160 an additional routine automatically compiles a proposed posting or "brief" for the entity. The brief preferably takes the form of a one page summary created for the purpose of prompting and assisting an individual in constructing an original piece of content about one or more of the stories deemed relevant from the brew.

The brief therefore is generated from the base stock noted above, and contains a trending topic from the user's brew. It shows links from the brew relevant to the topic. In one embodiment, it can shows pieces of owned content from the brand that are relevant to the topic. Preferably the brief has some combination of stock and flow content to optimize engagement potential. The particular form of the brief is expected to vary from application to application, with the main theme being that it takes a form optimized for assisting an operator to rapidly respond to breaking events and create new content.

The entity also specifies which channels it wishes to publish into at step 163. It will be appreciated that this could be done at the end of a new post synthesis operation. However because each channel has unique characteristics it is preferable to know in advance which medium to employ for crafting the new piece. Moreover the present application may include routines for detecting and scoring trending topics in a particular channel, and this detection may be used to influence a selection for a channel for a particular story, or, conversely, content for a story that should be included in a particular channel.

A publishing platform engine assists the user at step 170 in finalizing both the form and substance of a new piece. The platform prompts brand community managers with ideas for stock (brand content reserves) and flow (new developing topics, trends).

Channel specific recommendations, metadata and other rank enhancing content can supplied by a routine at step 172. One purpose of this data is to improve the visibility of the post by conventional search engines and other social search engines.

Other channel formatting parameters are derived and provided automatically by a routine 174. For example certain channels such as Twitter have specific restrictions on content length, or link formats, etc. These and other variables are considered as well by a publishing platform 170.

A dynamic posting interface (preferably a GUI) is used at step 176 to synthesize the final content for the new piece. The GUI (not shown) has a number of prompts to make it easy for operators to select, assemble and push out content to selected channels. The platform is configured so that the when a brand's community manager chooses to create a post, a posting drawer in the GUI automatically and dynamically rearranges itself depending on the content selected and the platform the brand is publishing to. This is because each channel/platform has its own unique way of formatting posts. On Twitter it's a 140 character limit, on Tumblr one can add tags and photos and on Facebook one must consider EdgeRank. The publishing platform 170 thus optimizes the new piece for each platform. For example in posting a brand's Instagram image to Facebook, the system knows that it can publish it as a full-sized photo. When posting to other sites such as Tumblr, it will suggest tags and recommend images relevant to your post. Other examples appropriate to other channels will be apparent to skilled artisans.

The new content post is then pushed at step 180 by one or more routines to the appropriate selected channels/source. The new content post is analyzed for key words, topics, ect. to determine which category corresponds to the post. The key words, topics, ect. are matched with the key words, topics, ect. of the content sources associated with the category. If matches are found between the post and the content source, the post is pushed to the content source. In some instances it may be desirable to first "queue" posts in a queue 178, where it can be released in accordance with instructions from a scheduler routine at step 179. The queue can make decisions based on editors' preferences and so as to maintain a regular flow of content to keep audiences engaged.

The posting queue makes it easy to schedule posts throughout the day or week—or even longer. A list of posts can be identified with specific release times, and can be provided with re-publishing parameters as well so that they are re-released based on time (i.e., every 3 or 4 hours) or in response to some other feedback metric (i.e., that the original post received substantial engagement, and a follow-up is likely to have success as well). Thus with this feature, a community manager with a busy day of meetings can sign on in the morning and schedule a full day's worth of posts. This avoids the problem of social media 'dead air'.

The scheduler routine 179 can be set to certain default values, or it can specify posting times on a channel by channel basis based on editors' publishing preferences. For example it may be determined that users in one platform have higher engagement rates at certain periods of the day, thus making such times more opportune. Community managers can edit any scheduled posts at will, including changing the date and/or time, and can choose to publish a scheduled post straight away instead.

At step 190 an additional routine(s) monitors engagement with the new content piece, including recent social activity around posts published to platforms at step 180. For example reblogs, likes, shares and retweets can be tracked. Other forms of adoption by an online community can be measured as well (surveys, polls, questionnaires, clicks) according to the domain where the content was published in accordance with known techniques.

Goals, benchmarks and other similar campaign metrics, determined manually, can be specified and measured by a routine at step 192, with alerts, notifications or reports generated in response to achieving such targets. For example an entity may wish to be notified if a particular piece is shared by more than N people. Timing constraints can be imposed as well (i.e., more than N engagements in a period of M hours, etc.) to assist in measuring the effectiveness of the postings in the various channels. To verify the degree of "lift" provided by the entity's post, pre-posting measurements may be made as well to ascertain the degree of awareness or mention of specific topics, categories, etc. This measurement again can be done using conventional tools and can be repeated after publishing new content to identify and confirm the utility and engagement with the materials.

As seen above, embodiments of the application permit entities to create marketing campaigns of continuous, scalable stream of both "stock" and "flow" content. As alluded to earlier, stock is typically materials brands are used to producing (TV commercials, web videos, and such) and is time intensive but has a relatively long shelf life. In contrast, flow represents rapidly generated content that is usually not the province of brands and is not typically part of their marketing mix. This is because brands (large ones especially) are uncomfortable because all the structures around advertising—like focus groups and long lead times—break down in a real-time response environment.

The present disclosure assists and removes some of this uncertainty to increase a stock/flow content balance message for such entities. There is significant value to a content strategy that builds off a combination of both types of content, stock and flow for a number of reasons. To begin with, Stock is great at attracting new audiences. It's the Bright Shiny Object that brings new people to the brand. At this time however, and using conventional tools, most brands could never produce enough stock content to fill their daily and weekly content needs across all social platforms. Flow, on the other hand, is what engages them for longer interactions. Since almost all brand content has some sort of follow mechanism attached to it brands are challenged with how to continue to deliver interesting messages to the folks that find and follow them. Flow solves that problem by ensuring a steady stream of new and relevant material.

Figure 3:
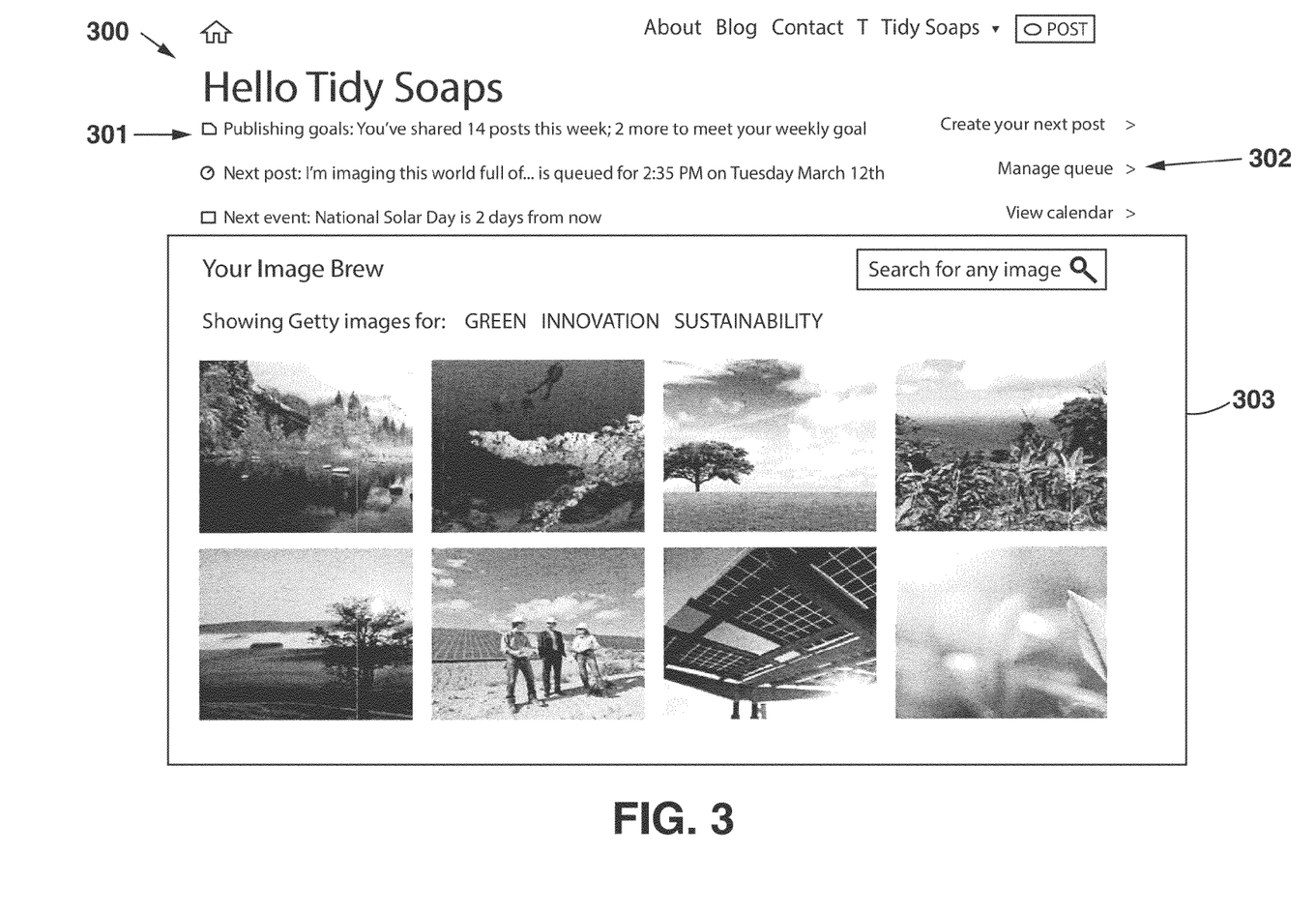
FIG. 3 illustrates an example of a user interface.

FIG. 3 illustrates an example of a user interface of the content creation and management system. The interface 300 provides communication between content creation and management system 114 and the client 101 *a-c*, as illustrated in FIG. 1. The sample screenshot provides an exemplary display of interface functionality that may be implemented by underlying software executable code or electronic processing operations. In additional embodiments, the user interface may be used to specify benchmarks and goals for the user 301, manage posting queues 302, and view a brew of content items 303, The user is able to select a content item of interest and post or re-post the item to various content sources.

Figure 4:
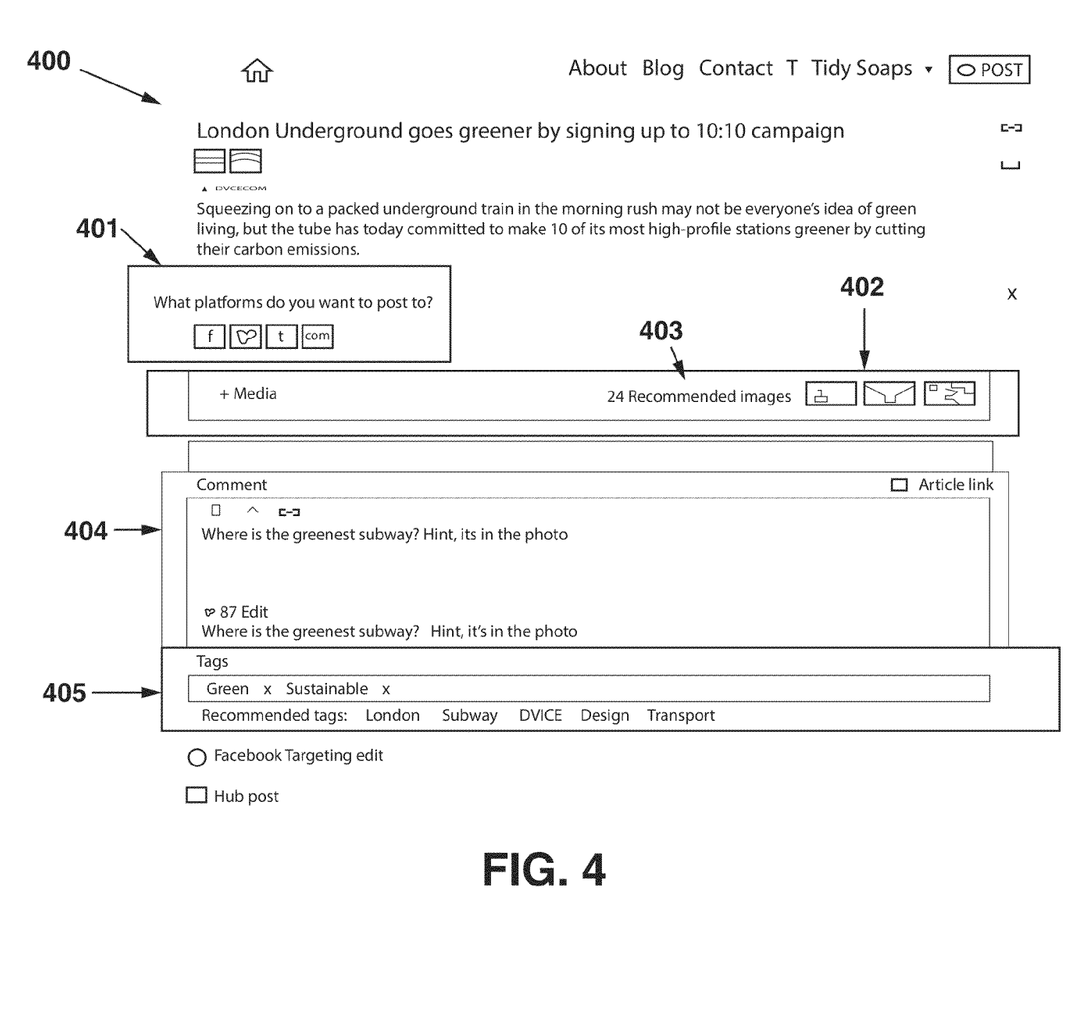
FIG. 4 illustrates an example of a user interface of the content creation and management system that allows the user to post or re-post content items to various content sources.

FIG. 4 illustrates an example of a user interface 400 of the content creation and management system that allows the user to post or re-post content items to various content sources. For example, a content item that has been selected from the brew of content items can be re-posted with comments or the user can create a new post. The user is able to select various content sources they wish to post the content items to 401. The content sources are determined through the process disclosed above. In one embodiment, additional content sources can be added or deleted based on the user's need. When creating a post, the user is able add media or article links to the post 402. In one embodiment, the system may recommend images or media based on the topic of the post 403. The recommended images are from various content sources that may discuss the same or similar topic as the post. The comment box 404 allows the user to comment on various subject, media, or articles. The user is also able to tag the post 405. By tagging the post, the content item can be properly categorized based on its content. In one embodiment, the system can recommend tags based on the content items. By selecting the post button, the user can send the post or re-post to the selected content sources.

The processing steps shown in the figures above are preferably implemented on a computing system (which may include one or more separate interconnected devices, servers, etc.) which is configured to execute a number of automated computing routines. These routines can be implemented using any one of many known programming languages suitable for creating applications that can run on large scale computing systems, including servers connected to a network (such as the Internet). Such applications are embodied in tangible, machine readable form for causing a computing system to execute appropriate operations in accordance with the present teachings. The details of the specific implementation of the present application will vary depending on the programming language(s) used to embody the above principles, and are not material to an understanding of the present application.

The present application is described in the following Examples, which are set forth to aid in the understanding of the application, and should not be construed to limit in any way the scope of the application as defined in the claims which follow thereafter.

What is claimed is:

1. An automated computer system for creating content for an entity comprising:
   a computing device having a processor and memory storing one or more software routines the processor configured therewith at least to:
   categorize a plurality of content sources, wherein each content source is related to a category;
   determine a first set of content reference sources by matching relevant content sources with the categorized content sources;
   determine a second set of content reference sources, the second set of content reference sources relate to a brand theme;
   determine a combined set of content sources, the combined set of content sources including content reference sources from the first and second set of content reference sources;
   determine a similarity score indicating a similarity between content sources in the combined set of content sources;
   define a virtual content channel, wherein the virtual content channel comprises content sources in the combined set of content sources that are above a similarity threshold based on the similarity score;
   monitor the virtual content channel on behalf of the entity to identify at least one link to an online story of potential interest to the entity;
   generate a score for the online story based on entity content specification requirements and entity creation requirements;
   present the online story to an operator for said entity;
   present a publishing tool to said operator, the publishing tool adapted to automatically configure a content piece for publication into one or more channels, each of which channels imposes different publishing formatting constraints;
   create a set of recommended content for the operator to be incorporated within a new content piece, said recommended content including one or more links, text or multimedia data;
   create the new content piece with said publishing tool under control of said operator, the new content piece created based on a compilation of said online story, entity related content, operator provided content, and said recommended content;
   publish said new content piece into said one or more channels in a format appropriate to each of said one or more channels;
   compile an index of the entity related content;
   compile a reference set comprising at least one of: keywords, topics and categories associated with reference content sources;
   receive entity content specification requirements of a target content of the entity, the content specification requirements comprising at least one of keywords, topics and categories;
   receive entity target content creation requirements comprising at least a timing parameter; and
   define the virtual content channel for said entity based on said reference set, said entity content specification requirements and said entity target content creation requirements.

2. The system of claim 1, further comprising a routine adapted to queue new content pieces until released by the operator.

3. The system of claim 1, further comprising a routine adapted to queue new content pieces until released by an automated scheduler.

4. The system of claim 1, further comprising a routine adapted to monitor and measure online engagement with said new content piece over a time period.

5. The system of claim 4, wherein said virtual content channel is adjusted based on said measured online engagement and altering said combined set of content sources.

6. The system of claim 1, wherein an initial feed from said virtual content channel is created and then adjusted by altering at least one of said combined set of content sources and a scoring algorithm used for rating online stories.

7. The system of claim 1, further comprising a routine controllable by the operator for adjusting content in said virtual channel.

8. The system of claim 1, further comprising a routine adapted to measure a timeliness rating for stories published by content sources in the first set of content reference sources; wherein the virtual content channel is further based on a comparison of said timeliness rating to an entity target content currency parameter required for content published by the first set of content reference sources.

9. The system of claim 1, further comprising a routine for determining a demographics profile of sources used by content sources in the first set of content reference sources; wherein the virtual content channel is further based on a comparison of said demographics profile to an entity target profile parameter required for content published by the first set of content reference sources.

10. The system of claim 1, further comprising a routine adapted to measure a frequency of a topic mention rating for stories published by content sources in the first set of content reference sources; wherein the virtual content channel is further based on a comparison of said frequency of a topic mention rating to an entity target content frequency parameter required for content published by the first set of content reference sources.

11. The system of claim 1, further comprising a routine adapted to measure a tone or sentiment rating for stories published by content sources in the first set of content reference sources; wherein the virtual content channel is further based on a comparison of said tone or sentiment rating to one of an entity target content tone and sentiment parameter required for content published by the first set of content reference sources.

12. The system of claim 1, further comprising a routine adapted to measure a frequency of publication for stories by content sources in the first set of content reference sources; wherein the virtual content channel is further based on a comparison of said frequency of publication to an entity target content publishing frequency parameter required for content published by the first set of content reference sources.

13. The system of claim 1, further comprising a routine adapted to measure at least one of a content size and content media type of stories published by content sources in the first set of content reference sources; wherein the virtual content channel is further based on a comparison of said at least one of content size and content media type to at least one of an entity target content size and media type parameter required for content published by the first set of content reference sources.

14. The system of claim 1, further comprising a routine adapted to measure a popularity score of content sources in the first set of content reference sources; wherein the virtual content channel is further based on a comparison of said popularity score to an entity target content popularity parameter required for content published by the first set of content reference sources.

15. An automated computer system for creating content for an entity comprising:
   a computing device having a processor and memory storing one or more software routines the processor configured therewith at least to:
   categorize a plurality of content sources, wherein each content source is related to a category;
   determine a first set of content reference sources by matching relevant content sources with the categorized content sources;
   determine a second set of content reference sources, the second set of content reference sources relate to a brand theme;
   determine a combined set of content sources, the combined set of content sources including content reference sources from the first and second set of content reference sources;
   determine a similarity score indicating a similarity between content sources in the combined set of content sources;
   compile a reference set comprising at least one of: keywords, topics and categories associated with reference content sources;
   receive entity content specification requirements of a target content of the entity, the content specification requirements comprising at least one of keywords, topics and categories;
   receive entity target content creation requirements;
   define a virtual content channel based on the reference set, the entity content specification requirements and the entity target content creation requirements, wherein the virtual content channel comprises content sources in the combined set of content sources that are above a similarity threshold based on the similarity score;
   monitor the virtual content channel on behalf of the entity to identify at least one link to an online story of potential interest to the entity;
   generate a score for the online story based on the entity content specification requirements and the entity creation requirements;
   present the online story to an operator for the entity;
   present a publishing tool to the operator, the publishing tool adapted to automatically configure a content piece for publication into one or more channels, each of which channels imposes different publishing formatting constraints;
   create a set of recommended content for the operator to be incorporated within a new content piece, the recommended content including one or more links, text or multimedia data;
   compile an index of entity related content;
   create the new content piece with the publishing tool under control of the operator, the new content piece created based on a compilation of the online story, the entity related content, operator provided content, and the recommended content; and
   publish the new content piece into the one or more channels in a format appropriate to each of the one or more channels.

* * * * *